Sept. 30, 1958　　A. W. GERNHARDT　　2,853,753
SHELL MOLDING MACHINE
Filed Aug. 1, 1955　　3 Sheets-Sheet 1
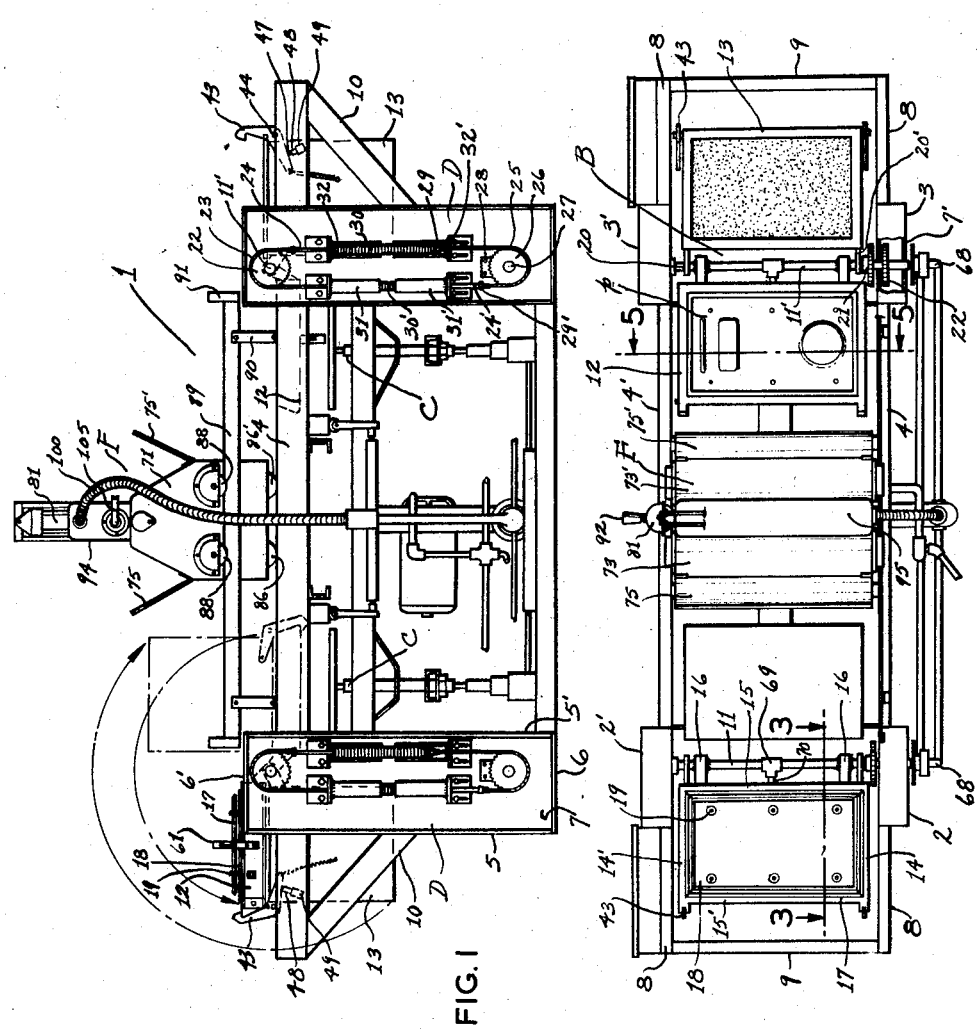
INVENTOR.
ARTHUR W. GERNHARDT
BY
ATTORNEY Sept. 30, 1958 — A. W. GERNHARDT — 2,853,753
SHELL MOLDING MACHINE
Filed Aug. 1, 1955 — 3 Sheets-Sheet 2
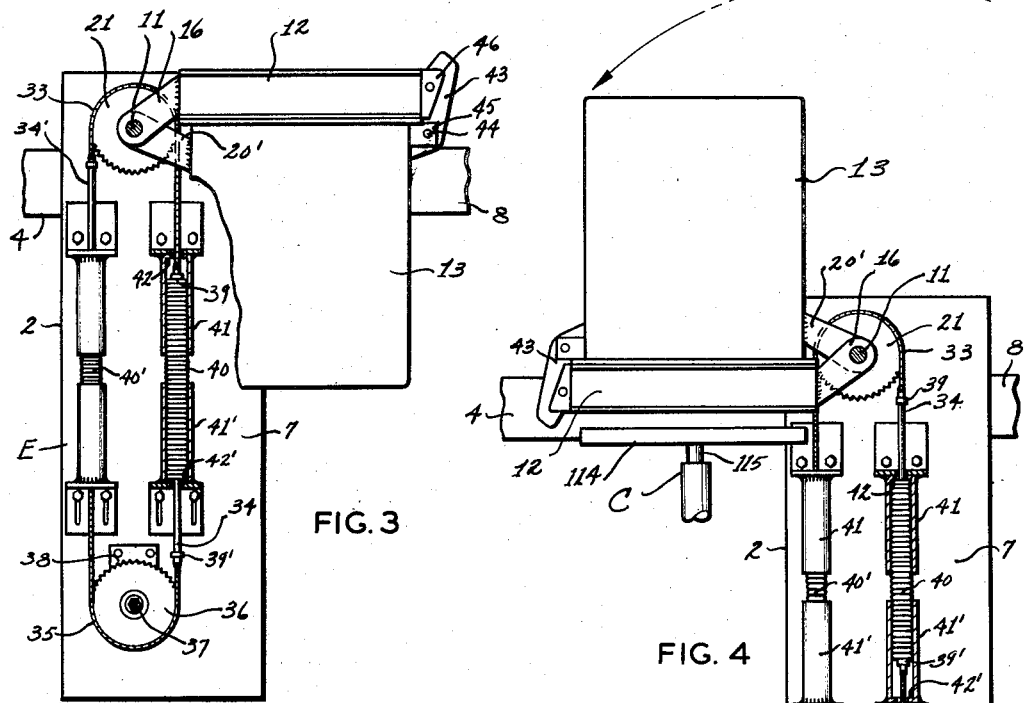
FIG. 3
FIG. 4
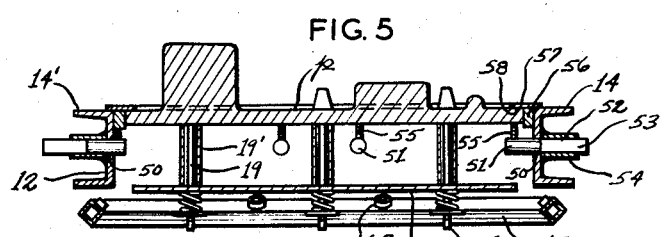
FIG. 5
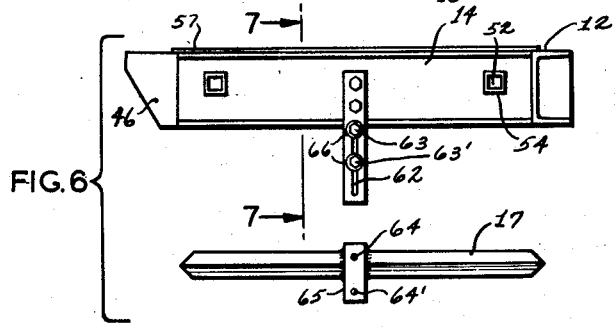
FIG. 6
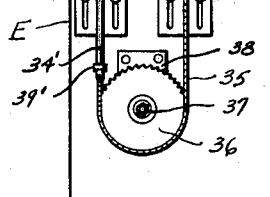
FIG. 7
*INVENTOR.*
ARTHUR W. GERNHARDT
BY Ralph N. Kalish
ATTORNEY Sept. 30, 1958   A. W. GERNHARDT   2,853,753
SHELL MOLDING MACHINE Filed Aug. 1, 1955   3 Sheets-Sheet 3

INVENTOR.
ARTHUR W. GERNHARDT
BY
ATTORNEY

United States Patent Office 2,853,753
Patented Sept. 30, 1958

2,853,753

SHELL MOLDING MACHINE

Arthur W. Gernhardt, St. Louis, Mo., assignor to Tyler Metal Products Company, St. Louis, Mo., a corporation of Missouri Application August 1, 1955, Serial No. 525,672

17 Claims. (Cl. 22—9)

This invention relates in general to molding, and more particularly, to certain new and useful improvements in shell molding machines.

An object of the present invention is to provide a shell molding machine wherein the dump box or investment hopper and pattern frame are mounted upon a common shaft, so that the same will swing about the same center when being moved into, and from, investment relationship.

Another object of the present invention is to provide a shell molding machine incorporating counter-balancing systems for the dump box and pattern frame whereby the swinging of the same will be uniform throughout, with attendant reduced power requirement, and elimination of the expected wear on gears and motor.

Another object is to provide a shell molding machine having a pattern frame with means for rapid and effective change of pattern plate, which operation may be accomplished by a relatively unskilled individual in minimum time, and thereby materially reduce the change time heretofore necessitated in shell molding procedures.

A further object of this invention is to provide a shell molding machine comprising a pattern frame carrying a heating unit adapted for adjustable relationship with respect to said frame for control of heat supplied to the pattern plate.

A further object is to provide a shell molding machine incorporating a mobile shell curing oven designed to effect even heat distribution so that the more elevated portions of a shell will be heated to a like extent as the lower portions thereof, and thereby obviate the over-or excess curing of raised shell portions as brought about by currently used curing ovens.

These and other detailed objects are obtained by the structures illustrated in the accompanying drawings (3 sheets) in which—

Figure 1 is a side elevation view of a shell molding machine constructed in accordance with and embodying the present invention, with the cover plates for the uprights being removed.

Figure 2 is a top plan view of the shell molding machine.

Figure 3 is a vertical transverse section taken on the line 3—3 of Figure 2.

Figure 4 is a vertical transverse section taken substantially on the line 3—3 of Figure 2, showing the dump box in inverted position.

Figure 5 is a horizontal transverse section taken on the line 5—5 of Figure 2.

Figure 6 is an exploded side view of the pattern frame and burner.

Figure 7 is a vertical transverse section taken substantially on the line 7—7 of Figure 6 showing the burner in mounted position.

Figure 8:
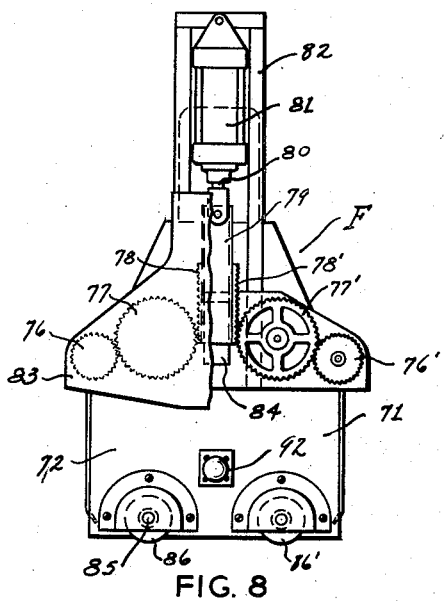
Figure 8 is a side elevational view of the oven.

Referring now by reference characters to the drawings, 1 designates a shell molding machine which may be adapted for automatic operation, comprising a main frame having two pairs of spaced uprights 2, 2' and 3, 3', a pair of spaced parallel horizontal members 4, 4', preferably of channel stock and fixed at their ends to the adjacent sides of the proximate uprights. Each of the uprights 2, 2', 3, 3' is of general box construction to form an enclosed compartment, each having end walls 5, 5' top and bottom walls 6, 6', and inner and outer side walls 7, 7'; said outer wall 7' being adapted for removal to provide access to the interior of the uprights 2, 2', 3, 3' (Figures 1 and 2). Secured to the outer end walls 5 of each upright 2, 2', 3, 3', in substantial alignment with horizontal members 4, 4', are short, parallel arms 8, which at their ends are welded to a connecting cross member 9 with brace members 10 extending obliquely between the outer end portions of said arms 8 and the intermediate portion of end wall 5 of the adjacent upright 2, 2', 3, 3' respectively. Journaled at their ends in bearings provided in the inner plates 7 of uprights 2, 2' and uprights 3, 3', adjacent the upper ends thereof, for extension therebetween, are shafts 11, 11', respectively, upon each of which is mounted, by suitable brackets, a pattern frame 12 and an open-top investment hopper or dump box 13 of a molding assembly, generally designated B. Provided for use with each molding assembly B is an ejector unit indicated at C presented adjacent uprights 2, 2' and uprights 3, 3' and beneath the end portion of horizontals 4, 4'. It will, thus, be noted that machine 1 is of the so-called double ended or symmetrical type, wherein the structure at either end is identical. Machine A may be optionally operated as a single or double unit. Accordingly, to facilitate an understanding of this machine, the following details of construction will be restricted to but one end thereof.

Pattern frame 12 is of open top and open bottom construction, being rectangular with parallel side members 14, 14' and end members 15, 15' respectively, fabricated preferably of channel stock and with the flanges directed outwardly. (Figure 5.) Extending from, and integral, with end member 15 are spaced, bearing brackets 16 for fixedly receiving shaft 11, whereby upon rotation of the latter, pattern frame 12 will be swung therewith.

Pattern frame 12 is normally supported upon rests (not shown), and carries a conventional pattern plate p on its upperly presented or top portion. Disposed at the bottom of pattern frame 12 and adjustably mounted thereon, in a manner to be described hereinbelow, is a pattern plate burner 17. Forming a part of the assembly of pattern plate p is a base plate 18 carrying a plurality of spring-biased ejector pins 19, which are each surrounded by a tubular spacer 19' abutting at its ends against the underside of pattern plate p and the upper surface of base plate 18.

Dump box 13 is provided in its inner upper portion with spaced brackets 20, 20' for free, unengaged extension therethrough of shaft 11. Rigid, as by welding, with bracket 20' is a sprocket 21, which is likewise freely or impositively mounted on shaft 11 whereby box 13 together with sprocket 21 will not be affected upon normal rotation of shaft 11. Stops (not shown) are provided on the machine frame for supporting dump box 13 in its normal position. Sprocket 21 is disposed on shaft 11 for presentment adjacent the inwardly presented face of inner plate 7 of upright 2.

Secured on the end of shaft 11 projecting beyond inner plates, and within the enclosure of upright 2, is a sprocket 22 of a pattern frame counter-balancing system, designated generally D (Figure 1), which comprises a chain section 23 trained thereabout with its opposite ends being engaged to the upper ends of vertical, parallel rods 24, 24', which, in turn, are connected at their lower ends to a chain section 25 engaged upon a sprocket 26 carried upon an idler shaft 27 journaled in a bracket 28 mounted on inner plate 7 at its lower end. Each rod 24, 24' is provided adjacent its upper and lower ends with shoulders 29, 29', respectively, against which normally bear the ends of relatively heavy compression springs 30, 30', respectively, disposed encirclingly about each rod 24, 24', respectively. Springs 30, 30' are each retained within a pair of upper and lower cylindrical housing members 31, 31', respectively, mounted, as by integral brackets, upon upright 2. At the upper end of each upper housing 31 and the lower end of each housing 31' there is formed an annular bearing surface or shoulder 32, 32', respectively, for bearing engagement against the ends of the retained spring; the opening within said bearing surfaces 32, 32' being of sufficient diameter to permit movement therethrough of the associated rod 24, 24'.

Upon rotation of sprocket 22, pursuant to operation of shaft 11, one vertical rod 24, 24', as the case may be, will be carried upwardly, effecting compression of its associated spring 30 or 30', against the bearing surface 32, of the related uper housing 31 while the other rod will be carried downwardly to cause compression of the other spring against the bearing surface 32' of the related lower housing 31'. Thus, said springs 30, 30' will be stressed so as to resist or impede the rotation of said shaft 11 for countering the gravitational force developed by pattern frame 12 as it is moved through its arc of travel.

There is provided a similar counter-balancing system, designated E, for dump box 13, as shown in Figures 3 and 4, which incorporates sprocket 21; a chain section 33 engaged thereon; a pair of rods 34, 34' secured at their upper ends to chain section 33 and at their lower ends to a chain section 35 which is engaged about an idler sprocket 36 mounted upon a shaft 37 journaled in a bearing bracket 38 secured on the inner face of the inner plate 7 of upright 2. Each rod 34, 34' is provided at its upper and lower ends with shoulders 39, 39', respectively, for bearing engagement with the ends of compression springs 40, 40' disposed respectively thereabout; each spring 40, 40' being retained in upper and lower housings 41, 41', which respectively have at their upper and lower ends bearing surfaces 42, 42'. System E is provided on the inner face of inner plate 7 of upright 2, while system D is provided on the outer face thereof.

With attention now being directed to the right hand side of Figure 1, dump box 13 is shown in its initial or rest position for charging with the prescribed investment or molding mixture, such as of a suitable resin and silica. Pattern frame 12 is disposed in its initial position, supported upon horizontals 4, 4', with pattern plate p being presented upwardly. To accomplish the investment of said plate p by the molding mixture, shaft 11 is rotated, which in this case may be effected by automatic means, through 180° to swing pattern frame 12 upwardly and then downwardly for disposition upon the open, upper end of dump box 13, for placing pattern plate p in confrontation with the molding mixture. Pattern frame 12 and dump box 13 will thereon be locked together by means of spring-biased latch arms 43, fixedly carried on a rod 44 supported for rotation by brackets 45 mounted on dump box 13. Cam elements 46 fixed on end 15' of pattern frame 12 coact with said latch arms 43 for the mutual locking engagement. Upon locking of frame 12 and dump box 13, shaft 11 will be reversibly rotated in the path indicated by the upper arrow at the left hand side of Figure 1 and as shown in Figure 4, to present dump box 13 in inverted position upon pattern frame 12 to allow the molding mixture to be "dumped" coveringly upon pattern plate p.

Subsequent to the investment, the duration of which may be automatically timed, shaft 11 is again rotated to swing, as a unit, the still locked pattern frame 12 and dump box 13, returningly through the initial arc of travel to restore dump box 13 to its upright position (as shown by the lower arrow at the left hand side of Figure 1). At this juncture latch arms 43 are disengaged from pattern frame 12 by means of a cam member 47 mounted on the piston 48 of a relatively small air cylinder 49 which is carried at one side of dump box 13 for movement therewith. Upon operation of air cylinder 49, through conventional means not shown, cam member 47 is pushed outwardly for engaging the under side of one latch arm 43 to cause rocking of the same with like movement being transmitted to the other latch arm through rotation of rod 44. Cam member 47 is withdrawn in timed relation to return swinging of pattern frame 12 so as to permit restoration of latch arms 43 through spring bias for potential latching. Upon disengagement of pattern frame 12 from dump box 13, pattern frame 12 will be returned to its original position, upon reverse rotation of shaft 11, with the now-invested pattern plate p presented for curing of the shell s as will be described below.

By utilization of a common shaft, 11, described above, for pattern frame 12 and dump box 13, a prescribed series of rotations in alternating direction is requisite for effecting the investment. Normally, such operation with the entailed swinging of pattern frame 12 and dump box 13 would create a severe load upon the machine, with substantial power, being needed and bringing about marked wear on the gears and motor. These undesirable results are effectively prevented by counterbalancing systems D and E. Referring again to the right hand side of Figure 1, with pattern frame 12 in its initial position of rest rod 24 will be in elevated position, with spring 30 being in tension through compression between lower shoulder 29' of rod 24 and upper bearing surface 32 of the related upper spring housing 31. Rod 24' will be in correspondingly lowered position with associated spring 30, in compression against lower bearing surface 32' of lower spring housing 31'. As pattern frame 12 is swung, rod 24 will be lowered and rod 24' will be elevated, sequentially releasing tension on springs 30, 30' until the same are normally in neutral or unstressed position, and, then increasing tension by compression of said springs 30, 30' in a reverse manner (see the left hand side of Figure 1). Thus, it will be seen that during the movement of pattern frame 12 from its initial or rest position to disposition on top of dump box 13, springs 30, 30' will counter the gravitational force, so that pattern frame 12 will be moved smoothly and uniformly through its arc of travel. During such solitary swinging of pattern frame 12, counter-balancing system E will be unaffected, since shaft 11 rotates freely within the dump box brackets 20, 20' and sprocket 21. However, after pattern frame 12 and dump box 13 are latched together, counter-balancing system E is then operatively connected to shaft 11, so that upon reverse rotation thereof with the now-latched pattern frame 12 and dump box 13 (in the path indicated by the arrow in Figure 4), rotation will be imparted to sprocket 21, since the latter being rigid with dump box 13 will be rotated as the same is swung. Thereupon, rod 34 will be carried upwardly for compression of spring 40 against bearing shoulder 42, while rod 34' is moved correspondingly downwardly for compression of associated spring 40' against the related bearing shoulder 42'. Thus, springs 40, 40' will, through such swinging of dump box 13 be sequentially released from their normal stressed condition and then placed under tension in the opposite manner. Springs 40, 40' will counter the gravitational effect of the swinging of dump box 13, so that the same will be constrained to move evenly through its arc of travel. Concurrently, the springs 30, 30' will be compressed in a manner opposite to that when pattern frame 12 is swung on to dump box 13. Thus, counterbalancing system E will operate during the swinging of dump box 13, and upon unlatching of same from pattern frame 12 will be operatively disconnected from shaft 11, and returned to original condition. Each system will operate to resist rotation in the particular desired direction. Hence, both counter-balancing systems D and E will be simultaneously operated while pattern frame 12 and dump box 13 are latched together. With counter-balancing systems D, E, incorporated in machine 1, the power requirements thereof for effecting such necessary swinging of the dump box 13 and pattern frame 12 will be markedly reduced. The diminished load, thereby placed on machine 1 will produce smooth and easy operation, with elimination of undue wear upon the gears and motor, hence materially increasing the economical operation of machine 1.

The opposite end of shaft 11 is engaged to the transmission system of a motor for effecting automatic rotation of said shaft 11. Such power means are not described herein, since they do not form a part of the present invention.

With reference being now made to Figure 5, each end wall 15, 15' and side wall 14, 14' of pattern frame 12 is spacedly drilled, at preferably two points, to provide apertures 50 for each accommodating the inner cylindrical portion 51 of a slide block 52, for retaining pattern plate p in position, having an outer portion 53 of square cross section, the length of the sides of which is the same as the diameter of the inner portion 51. Said outer, squared portions 53 are slideably received within short, square sleeves 54 welded at their inner ends to the side and end walls of pattern frame 12 in alignment with apertures 50. The inner end of said squared portions 53 abut against the outer face of said side and end walls whereby the extent of inward movement of said slide blocks 52 is limited. Adjacent the inward extremity of the cylindrical portion 51, each slide block 52 is diametrally tapped for receiving a set screw 55. Suitably secured to the inner face of each side and end wall 14, 14', 15, 15' above apertures 50 therein, is an abutment strip 56, the upper edge of which is flush with the upper flange of the adjacent side or end walls. Mounted upon the upper surfaces of said side and end walls 14, 14', 15, 15' and abutment strips 56 are relatively thin, flat sections 57, extending completely about the upper end of frame 12, and projecting inwardly of said abutment strips 56 to form a continuous shoulder 58.

Pattern plate p is mounted on pattern frame 12 with its edges abutting the inner surfaces of said strips 56 and its upper edge adjacent portions disposed against shoulder 58. Set screws 55 are threaded for radial projection for contacting the undersurface of pattern plate p (see right hand side of Figure 5) to maintain same rigidly against shoulder 58; side blocks 52 being in full inward position. As thus held by set screws 55, pattern plate p is securely mounted against inadvertent displacement during the molding procedure. When it is desired to change pattern plates, set screws 55 are loosened sufficiently to permit slide blocks 52 to clear the undersurface of abutment strips 56 upon outward sliding thereof to the position shown at the left hand side of Figure 5. Pattern plate p may then be most easily removed from frame 12 by being lifted through the opposite or normally bottom open end thereof. A replacement pattern plate p may be expeditiously installed in frame 12, with slide blocks 52 being returned to inward position and set screws 55 outwardly threaded. This feature of permitting rapid change of pattern plate is most economical and unique, as it will permit this operation to be accomplished in a manner of a relatively few minutes, whereas heretofore, such change has proved a most difficult undertaking, requiring extensive periods of time, which have customarily amounted to a day, with the attendant loss of utility of the machine during the interval.

Provided on pattern frame 12, substantially intermediate the outer face of each side wall 14, 14' thereof, is a welded or otherwise fixed boss 59, the outer surface of which is aligned with the outer edges of the flanges of said side walls 14, 14' (see Figure 7). Each boss 59 is tapped to provide a pair of vertically aligned threaded openings for receiving bolts 60 for mounting thereon a narrow, vertically extending strap or bracket 61, which projects beyond the lower edge of side walls 14, 14' and is provided with an elongated slot or aperture 62, for extension therethrough, at selected points, of a pair of bolts 63, 63' for engagement within internally threaded openings 64, 64', respectively, provided in a boss 65 rigid on the adjacent side of gas burner 17. Metallic washers 66 may be used upon bolts 63, 63' to effect tight engagement. Burner 17, being constructed, preferably, of square tubular stock and having a plurality of spaced burner tips 67 on its inner and upwardly presented surface, is, thus, intimately secured to pattern frame 12 for travel therewith, so that pattern plate p is at all times maintained at the desired temperature, with the heat being uniformly distributed thereabout, thus obviating the possibility of any premature cooling thereof with resultant imperfections in the shells being formed. By means of slot 62 in straps 61, burner 17 may be adjusted, toward and away from the particular pattern plate p being carried by pattern frame 12, so that the degree of heat being supplied may be controlled in accordance with the specific operational requirements. Gas is supplied to burner 17 from a convenient source, as through a conduit 68, which is connected, by a suitable fitting, to shaft 11; said shaft being hollow or tubular and having a T-fitting 69 intermediate its length for securement to a short flexible pipe 70, which is engaged to burner 17. Thus, gas is continuously supplied to burner 17, whether stationary or swinging. It is, of course, obvious that the heat emitted by burner 17 may be controlled by valves located within the supply lines.

Figure 9:
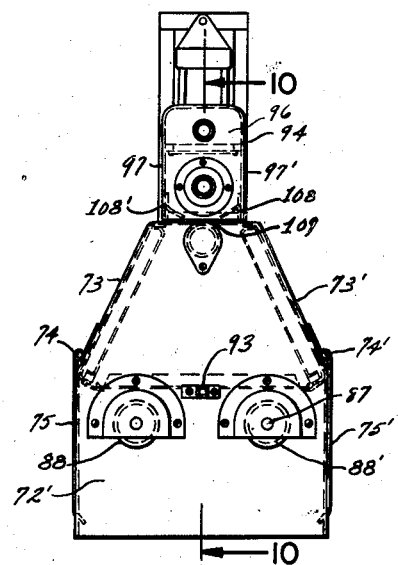
Figure 9 is an elevational view of the other side of the oven.
Figure 10:
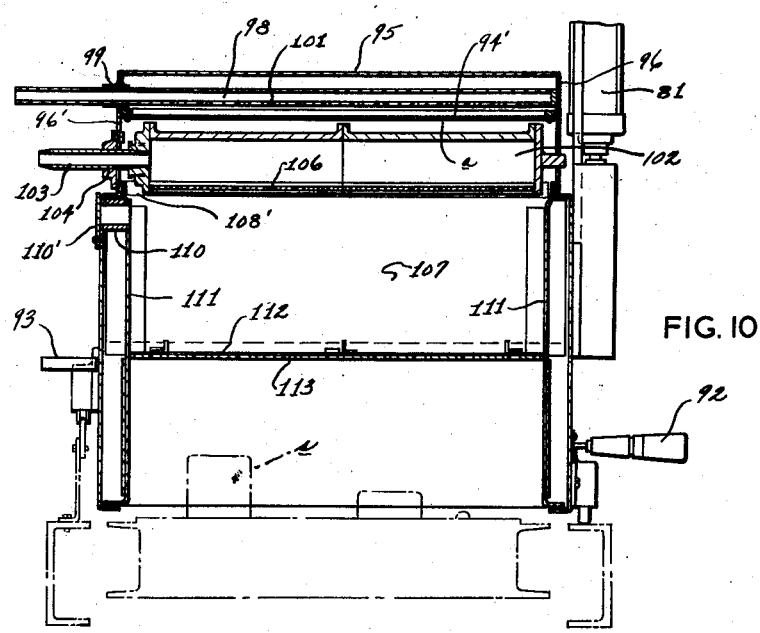
Figure 10 is a vertical transverse section taken on the line 10—10 of Figure 9.

Provided for mobile disposition upon machine 1 is a shell-curing oven F comprising a housing or hood 71 having side panels 72, 72' which in their upper portions taper upwardly and inwardly and are engaged at their edges to end panels 73, 73'. Mounted on the lower portions of said end panels 73, 73' are hinges having a pintle 74, 74', respectively, upon which are suspended, for swinging action, doors 75, 75' for closure of the lower ends of housing 71. Pintles 74, 74' are each respectively engaged at one of their ends to a gear 76, 76' which, respectively mesh with driven gears 77, 77' which, in turn, mesh with vertical disposed racks 78, 78' respectively. Racks 78, 78' are carreid upon a slide 79 secured at its upper end to the piston 80 of a fluid cylinder 81 supported by a frame 82 on oven housing 71; there being a covering 83 for said gear trains. Thus, upon vertical movement of piston 80 in one direction responsive to action of cylinder 81, doors 75, 75' will be swung upwardly into oven-open position, as shown in Figure 1, while reciprocal movement in the other direction will effect closing of said doors (Figure 9). Slide 79 is recessed in its lower end for receiving a shock-absorbing pad 84 secured upon housing 71.

Mounted in tandem relation at the lower end of side panel 72 by means of stub shafts 85, mounted therein, are wheels 86, 86', which extend below the lower edge of said panel 72 for traverse along the upper flange of horizontal member 4. Disposed on side panel 72 spacedly upwardly of its lower edge, by stub shafts 87, is a pair of wheels 88, 88', having a V-shaped periphery for engaging a rail 89 presented in parallel, elevated relation to horizontal member 4, being co-extensive therewith, by means of a plurality of short uprights 90 fixed at their lower ends to said horizontal member 4'. At the opposite ends of rail 89 are mounted short detent members 91 for limiting the travel of oven F. Thus, by means of wheels 86, 86' and 88, 88', oven F may be easily manually moved, as by a handle 92, from disposition above one invested pattern plate p to the other for curing purposes. If desired, limit switches (not shown) may be provided on rail 89 for actuation by a bar or finger 93 projecting laterally outwardly from side panel 72, to effect automatic operation of fluid cylinder 81 for opening of oven doors 75, 75' at a predetermined point from the pattern plate p to be cured, and for closure of said doors after the oven is in curing position.

Mounted at the top of oven housing 71 is a burner housing 94 having a top wall 95, side walls 96, 96' and end walls 97, 97', and which in its lower portion communicates interiorally with said oven housing 71. Extending transversely across burner housing 94, adjacent top wall 95, is an air tube 98, one end of which projects outwardly through a bushing-provided opening 99 in side wall 96 for connection, by a flexible section of hosing 100, to a source of air under pressure. Said air tube 98, within burner housing 94, is provided on its under surface with a multiplicity of perforations or air outlets 101 for directing the emitted air downwardly.

Provided in burner housing 94 beneath air tube 98 is a distributor plate 94' perforated with a multiplicity of ports a for flow therethrough of air discharged from air tube 98. The particular diameter of ports a may be selected so that the air flow therethrough will have the desired characteristics for the type of combustion required, as described below. Also disposed in burner housing 94, beneath plate 94' and in axial parallel relationship with air tube 98, is a tubular burner 102, one end of which is connected to a diametrally reduced conduit 103 extending through an opening 104 in side wall 96 parallel to the projecting end of air tube 98 for connection to a source of fuel, such as a gas and air mixture, as by means of a conduit 105. In the undersurface of burner 102 is a plurality of fuel outlets or ports 106, causing the fuel to be discharged into a combustion chamber 107 formed in the upper portion of oven housing 71. The diameter of burner 102 is greater than that of air tube 98 so that air discharged through plate 94' will flow around burner 102 and be directed for mixture with fuel emanating from said burner 102 by baffle plates 108, 108' extending across said burner housing 94 at its lower end; said baffle plates 108, 108' being spaced apart a limited distance to define a throat 109 through which the discharged fuel passes.

Provided on oven housing side panel 74' at its upper end is an opening for a lighting tube 110, said opening having a pivotally mounted cover plate 110, to provide access to chamber 107 for ignition of the fuel. The sides of chamber 107 are constituted of inner panels 111 in spaced relation to side panels 72, 72' to create an insulating space therebetween to prevent heat loss. The lower end of chamber 107 is defined by a transversely extending distributor plate 112, having a plurality of openings 113 for emission of heat to the shell to be cured.

Due to the particular construction of oven chamber 107 the combustion gases in flowing downwardly will expand as a result of the tapering character of said chamber 107, with the development of expected turbulence creating a back pressure which will force the emission of the burning gases through ports 113 of distributor plate 112 in such manner as to effect an even distribution thereof. Thus, by such distribution ports at the sides of the plate 112 will have discharged therethrough heat of the same intensity as that passing through ports toward, and at, the middle of said plate 112, so that all portions of the shell s to be cured will receive equal heat. In shell curing, this is a most critical aspect, since uniform application of heat throughout will assure that all parts of the shell are cured to the same extent. With shells having relatively elevated portions the same will be "cooked" to the same degree as the depressed or lower portions. In ovens used heretofore equal heat distribution could not be effected, and the elevated portions of the shells would be cured to a much greater extent than the lower portions, resulting in defectiveness of the, thus, improperly cured shells. The unique construction of combustion chamber 107, and the relationship of same to burner tube 102 assures the desired heat distribution to the shell s.

Air tube 98 provides a secondary air supply, so that any proportion of air to gas may be provided in the fuel. Normally, the fuel supplied to burner 102 contains a certain, predetermined ratio of air to gas. However, this ratio may be varied by utilization of air discharged from air tube 98 for mixture with the fuel as the same is discharged into throat 109.

Understandably, the amount of oxygen in the fuel directly affects the character of the combustion of same, so that the particular nature of combustion desired for any molding mixture may be provided.

Subsequent to the curing operation, oven F having been removed from disposition above the now cured shell s, the ejector assembly C which consists essentially of an ejector plate 114 mounted upon member 115, movable vertically by conventional automatic means (not shown), is brought into operation whereby plate 114 is moved upwardly, engaging ejector pins 19 to force same upwardly against their associated springs for lifting shell s from pattern plate p.

It should be understood that changes and modifications in the formation, construction, arrangement, and combination of the several parts of the shell molding machine may be made and substituted for these herein shown and described without departing from the nature and principle of my invention.

Having thus described my invention, what I claim and desire to secure by Letters Patent is:

1. A shell molding machine comprising a frame, a shaft journaled in said frame, a pattern frame rigidly fixed on said shaft for swinging movement about said shaft, a sprocket secured to said shaft, a flexible member engaged upon said sprocket, an elongated member engaged to each end of said flexible member, a resilient member engaged to each elongated member, and a bearing-surface-forming member for engagement with each resilient member for compression thereagainst of the resilient members for impeding rotation of said shaft to produce even swinging of said pattern frame.

2. A shell molding machine comprising a frame, a shaft journalled on said frame, a pattern frame fixed on said shaft for swinging thereabout upon rotation of said shaft, a first sprocket fixed on said shaft, first resilient members operatively connected to said sprocket for impeding rotation of said shaft to effect uniform swinging of said pattern frame, a dump box, bearing brackets provided on said dump box for loosely receiving said shaft, a second sprocket fixed to one of said dump box bearing brackets and freely receiving said shaft, second resilient members operatively connected to said second sprocket for impeding rotation thereof, and means for locking said pattern frame and dump box together whereby upon subsequent rotation of said shaft, swinging of said pattern frame and dump box will be simultaneously effected and controlled.

3. In a shell molding machine, a pattern frame for receiving a pattern plate comprising parallel side members and parallel end members, at least each of said side members or each of said end members being provided with a plurality of spaced openings extending transversely of the related members, and slide blocks provided in said openings for retractable projection therethrough, said slide blocks being each provided with an adjustable element adjacent its normally inner end and axially normal thereto for supportingly engaging the under surface of the pattern plate received by the pattern frame.

4. In a shell molding machine, a pattern frame comprising parallel side members and parallel end members, at least each of said side members being provided with a plurality of spaced openings, an elongated slide block extending through each opening, and being tapped transversely adjacent its inner end, means for limiting the inward extension of said slide blocks through their associated openings, and an adjustable element threadedly engaged in such tapped portion and axially normal thereto for supportingly engaging the under surface of the pattern plate received by the pattern frame.

5. In a shell molding machine, a pattern frame for receiving a pattern plate comprising parallel side members and parallel end members, said side and end members being provided in their upper portions with an inwardly projecting shoulder, each of said side and end members being provided with a plurality of spaced openings, a slide block extending through each of said openings and being tapped adjacent its inner end, axially normal thereto, and a set screw mounted in the said tapped portion of each slide block for adjustably supportingly engaging a pattern plate on its undersurface to maintain same securely against said shoulder.

6. In a shell molding machine, a pattern frame for receiving a pattern plate comprising parallel side members and parallel end members, said side and end members being provided in their upper portions with an inwardly projecting shoulder, each of said side and end members being provided with a plurality of spaced openings, a sleeve-forming element of square cross section fixed to each side and end members projecting outwardly thereof in alignment with said openings, a slide block extending through each sleeve and opening and having a normally outer and an inner portion, said outer portion being of square cross-section, said inner portion being of circular cross-section, the diameter of said inner portion and the width of said outer portion being the same, said inner portion being diametrally tapped adjacent its inner extremity, and a set screw engaged in said tap for adjustably engaging a pattern plate on its undersurface to maintain same securely against said shoulder.

7. In a shell molding machine having a pattern frame for supporting a pattern plate to receive the molding mixture, a shell curing oven for disposition over an invested pattern plate comprising side walls tapering inwardly and upwardly in their upper portions, end walls extending between said side walls in their upper tapering portions, swingably mounted doors provided between said side walls in their lower portions, a distributor plate having a plurality of ports and being connected to the lower ends of said end walls and tapering portions of said side walls to define therewith an upwardly and inwardly tapering combustion chamber, and a fuel supply tube provided spacedly above the upper end of said chamber for discharging fuel thereinto whereby the fuel upon expansion permitted by the tapered characteristic of the chamber will create a pressure for effecting even distribution of heat through the ports of the distributor plate.

8. In a shell molding machine having a pattern frame for supporting a pattern plate to receive the molding mixture, a shell curing oven for disposition over an invested pattern plate comprising side walls tapering inwardly and upwardly in their upper portions, and being spaced apart at their upper ends to provide a narrow, transverse opening, end walls extending between said side walls in their upper tapering portions, swingably mounted doors provided between said side walls in their lower portions, a distributor plate having a plurality of ports and being connected to the lower ends of said end walls and tapering portions of said side walls to define therewith an upwardly and inwardly tapering combustion chamber, there being a burner housing mounted atop said oven and communicating with the combustion chamber through said narrow transverse opening, a fuel supply tube mounted in said burner housing in spaced relationship to said narrow, transverse opening for emission of fuel therethrough and into said combustion chamber whereby the fuel upon expansion permitted by the tapered character of the combustion chamber will create a pressure for effecting even distribution of heat through the ports of the distributor plate.

9. In a shell molding machine having a pattern frame for supporting a pattern plate to receive the molding mixture, a shell curing oven as described in claim 8, wherein an air supply tube is provided in said burner housing above said fuel supply tube, and an air distributor member disposed between said air supply tube and fuel supply tube.

10. In a shell molding machine having a pattern frame for supporting a pattern plate to receive the molding mixture, a shell curing oven as described in claim 7 wherein hinge members are provided on said end walls, doors mounted on said hinge members for swinging thereabout, motion transmitting means operatively connected to said hinges, and a fluid actuated member engaged to said motion transmitting means.

11. A shell molding machine comprising a frame, a shaft journaled in said frame, a dump box for receiving a supply of molding mixture, brackets, fixed on the normally upper end portion of said dump box for loosely receiving said shaft, a sprocket fixed to one of said brackets and loosely receiving said shaft, a flexible member engaged upon said sprocket, an elongated member engaged to each end of said flexible member, a resilient member engaged to each elongated member, a bearing-surface-forming member for engagement with each resilient member for compression thereagainst of the resilient members for impeding rotative movement of the shaft when said sprocket is coupled therewith, a member fixed on said shaft for swinging movement therewith, and means locking said member and said dump box together so that upon subsequent rotation of said shaft said sprocket will be coupled therewith.

12. A shell molding machine comprising a frame, a shaft journaled in said frame, a pattern frame rigidly fixed on said shaft for swinging movement thereabout, a sprocket secured to said shaft, a flexible member engaged upon said sprocket, an elongated member engaged to each end of said flexible member, a coil spring encirclingly disposed about each elongated member, each elongated member having a pair of spaced apart shoulders for compressing engagement with the associated spring whereby upon rotation of said shaft opposite shoulders of said elongated members will compressingly engage their related springs for impeding rotation of said shaft to produce even swinging of said pattern frame.

13. A shell molding machine comprising a frame, a shaft journaled in said frame, a pattern frame rigidly fixed in said shaft for swinging movement about said shaft, a first sprocket secured to said shaft, a first flexible member engaged upon said first sprocket, an elonagted member engaged to each end of said first flexible member, a coil spring encirclingly disposed about each elongated member, a second flexible member engaged to each of said elongated members, an idler shaft journaled in said frame, a second sprocket mounted on said idler shaft, said second flexible member engaged upon said second sprocket, each of said elongated members having a pair of spaced apart shoulders for compressing engagement with the associated spring whereby upon rotation of said shaft opposite shoulders of said elongated members will engage their related springs for compressing same in opposite directions for impeding rotation of said shaft to produce even swinging of said pattern frame.

14. A shell molding machine as described in claim 13 wherein fixed bearing-surface-forming members are mounted on said frame for normally engaging the coil springs at their ends, said bearing-surface-forming members being provided with openings through which the elongated members extend.

15. A shell molding machine as described in claim 13 wherein the elongated members are rods of equal length and said coil springs are of equal length and strength.

16. A shell molding machine comprising a frame, a shaft journaled on said frame, a pattern frame fixed on said shaft for swinging thereabout upon rotation of said shaft, first counter-balancing means for effecting uniform swinging movement of said pattern frame, said means comprising a sprocket secured to said shaft, a flexible member engaged upon said sprocket, an elongated member engaged to each end of said flexible member, a coil spring encirclingly disposed about each elongated member, each elongated member having spaced apart shoulders for compressing engagement with the associated spring whereby upon rotation of said shaft opposite shoulders of said elongated members are engaged with their related springs for compressing same in opposite direction, a dump box loosely supported on said shaft, second counter-balancing means operatively connected to said dump box, and means for causing mutual engagement of said pattern frame and dump box whereby upon subsequent rotation of said shaft said first and second counter-balancing means will be in simultaneous action.

17. A shell molding machine comprising a frame, a shaft journaled in said frame, a dump box for receiving a supply of molding mixture, brackets fixed on said dump box for loosely, non-positively receiving said shaft, a sprocket fixed to one of said brackets and loosely receiving said shaft, a flexible member engaged upon said sprocket, an elongated member engaged to each end of said flexible member, a coil spring encirclingly disposed about each elongated member, each elongated member having a pair of spaced shoulders for compressing engagement with the associated spring whereby upon rotation of said shaft opposite shoulders of said elongated members will engage their related springs for compressing same in opposite directions for impeding rotative movement of the shaft when said sprocket is coupled therewith, a member fixed on said shaft for swinging movement therewith, and means locking said member and said dump box together so that upon subsequent rotation of said shaft said sprocket will be coupled therewith.

References Cited in the file of this patent

UNITED STATES PATENTS

| | | |
|---|---|---|
| 975,159 | Robinson | Nov. 8, 1910 |
| 1,394,228 | Sheridan | Oct. 18, 1921 |
| 1,987,386 | Christie | Jan. 8, 1935 |
| 2,448,827 | Reder | Sept. 7, 1948 |
| 2,733,489 | Dahmer | Feb. 7, 1956 |
| 2,762,092 | Klamp et al. | Sept. 11, 1956 |

FOREIGN PATENTS

| | | |
|---|---|---|
| 1,097,027 | France | Feb. 9, 1955 |
| 1,080,942 | France | June 2, 1954 |
| 728,108 | Great Britain | Apr. 13, 1955 |

OTHER REFERENCES

American Foundryman, August 1952, pages 42–46.

Foundry Trade Jr., July 9, 1953, pages 53–59, pages 56 and 57 particularly relied on.

Foundry, November 1953, page 254.